(12) United States Patent
Sartori et al.

(10) Patent No.: US 10,264,307 B2
(45) Date of Patent: Apr. 16, 2019

(54) METHOD AND DEVICE FOR THE REMOTE RECORDING OF VIDEO PROGRAMS

(71) Applicant: SAGEMCOM BROADBAND SAS, Rueil Malmaison (FR)

(72) Inventors: David Sartori, Rueil Malmaison (FR); Pierre Sabatier, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/324,413

(22) PCT Filed: Jul. 7, 2015

(86) PCT No.: PCT/EP2015/065416
§ 371 (c)(1),
(2) Date: Jan. 6, 2017

(87) PCT Pub. No.: WO2016/005353
PCT Pub. Date: Jan. 14, 2016

(65) Prior Publication Data
US 2017/0171586 A1    Jun. 15, 2017

(30) Foreign Application Priority Data
Jul. 8, 2014   (FR) .................................... 14 56571

(51) Int. Cl.
*H04N 21/274*   (2011.01)
*H04N 21/433*   (2011.01)
(Continued)

(52) U.S. Cl.
CPC ....... *H04N 21/274* (2013.01); *H04N 21/4147* (2013.01); *H04N 21/4334* (2013.01);
(Continued)

(58) Field of Classification Search
CPC ............. H04N 21/274; H04N 21/4147; H04N 21/4334; H04N 21/4335; H04N 21/632; H04N 7/173
See application file for complete search history.

(56) References Cited

U.S. PATENT DOCUMENTS 7,930,723 B2    4/2011   Mikkelson et al.
2002/0046404 A1  4/2002   Mizutani
(Continued)

FOREIGN PATENT DOCUMENTS

WO    WO 2008/113948    9/2008

OTHER PUBLICATIONS

International Search Report and Written Opinion of the ISA for PCT/EP2015/065416, dated Sep. 4, 2015, 14 pages.

*Primary Examiner* — Hai V Tran
(74) *Attorney, Agent, or Firm* — Nixon & Vanderhye P.C.

(57) ABSTRACT

Method for the remote recording of a video program received in the form of a binary stream by at least one receiver, referred to as a recording receiver, having to record the video program on a remote server using a communication network. The method is implemented by each recording receiver and comprises, for each recording receiver, steps of obtaining (3051) a compression factor of the video program, of dividing (3054) the binary stream into a set of successive portions according to the compression factor obtained, of determining (305) a subset of portions to be transmitted to the remote server from all the successive portions according to an offset value and the compression factor, the offset value being a remainder of an integer division of a random number determined to find the recording receiver by the compression factor, and of transmission of the portions of the subset of portions determined to the remote server.

18 Claims, 9 Drawing Sheets

Figure 1A:
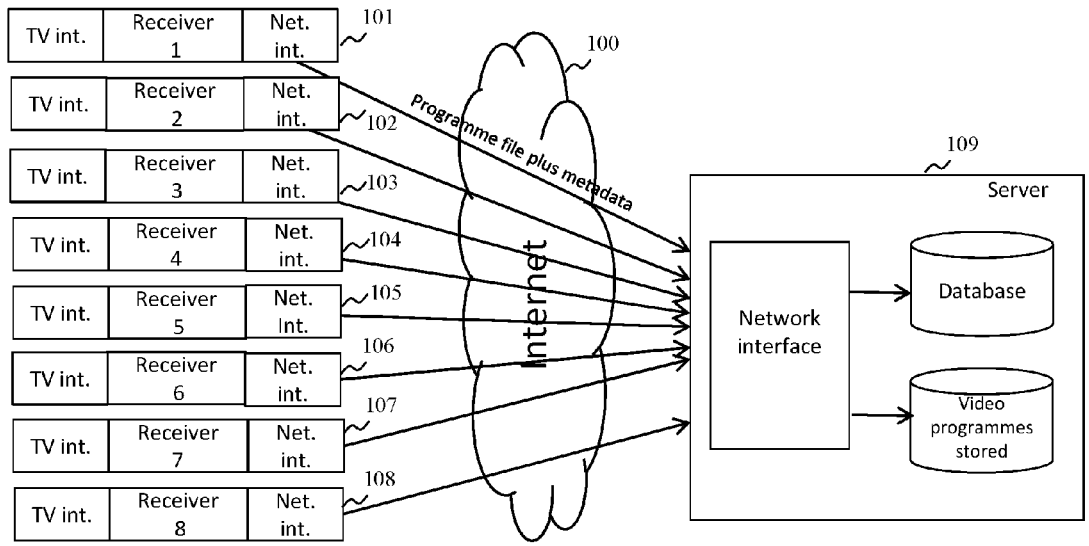

(51) Int. Cl.
  *H04N 21/845* (2011.01)
  *H04N 21/4147* (2011.01)
  *H04N 21/4335* (2011.01)
  *H04N 21/63* (2011.01)

(52) U.S. Cl.
  CPC ..... *H04N 21/4335* (2013.01); *H04N 21/8456* (2013.01); *H04N 21/632* (2013.01)

(56) References Cited

U.S. PATENT DOCUMENTS

2014/0013368 A1* 1/2014 Barrett ............... H04N 21/4334
  725/97
2014/0109142 A1   4/2014 Van Coppenolle et al.
2015/0324379 A1* 11/2015 Danovitz ........... H04N 21/2743
  707/825

* cited by examiner

METHOD AND DEVICE FOR THE REMOTE RECORDING OF VIDEO PROGRAMS

This application is the U.S. national phase of International Application No. PCT/EP2015/065416 filed 7 Jul. 2015, which designated the U.S. and claims priority to FR Patent Application No. 1456571 filed 8 Jul. 2014, the entire contents of each of which are hereby incorporated by reference.

The present invention relates to a method for the remote recording of a video program, a receiving device able to record remotely a binary stream representing a video program, a server device able to record a binary stream representing a video program and a system for recording video programs comprising said server device and at least one client device implementing the recording method.

The last few years have seen an explosion in means giving access to video programs (or television programs) and an increase of the video programs. Thus, whereas in the 1980s only analogue television broadcast networks were available, a private individual at the present time has access to video programs through many digital television broadcasting networks such as TDT (terrestrial digital television) broadcasting networks, and ADSL (asymmetric digital subscriber line) and 3G/4G-LTE (third/fourth generation) television broadcasting networks. These video programs (or television programs) can be viewed on many display devices such as a television screen, a computer screen, a digital tablet or a smartphone. The increase in video programs is to a major extent due to digitisation of the data representing these video programs. This is because, for almost identical quality, a digitised video program requires a transmission bandwidth very much less than the transmission bandwidth necessary for an analogue video program. For constant image quality, digitisation therefore makes it possible to transmit, on the same communication channel, a number of digitised video programs very much greater than a number of analogue video programs.

The digitisation of a video program comprises sampling followed by compression of the analogue data representing the video program in an audiovisual data compression format. There exist various audiovisual data compression formats comprising video data compression formats, audio data compression formats and audio and video data multiplexing and synchronisation formats.

The H264/AVC format (ISO/IEC 14496-10 MPEG-4 Part 10, Advanced Video Coding/ITU-T H.264) is currently the compression format most used for broadcasting video programs. This format will however have to be quickly supplanted by the emerging HEVC standard (ISO/IEC 23008-2 MPEG-H Part 2, High Efficiency Video Coding/ITU-T H.265) offering better compression performances for very high resolution videos.

The AAC audio compression format (ISO/IEC 13818-7, ISO/IEC 14496-3) is very much used for compressing audio data.

The MPEG-TS encapsulation format (ISO/IEC 13818-1) is frequently used, in particular by DVB (digital video broadcast) and ATSC (Advanced Television Systems Committee) broadcasting standards for encapsulating video streams and audio streams in the same binary stream and to ensure synchronisation of these streams.

It is very usual for a private individual to wish to record an audiovisual program. Many systems for receiving digitised video programs such as for example a digital decoder (which is commonly referred to as a decoder) associated with a residential gateway connected to the internet (commonly referred to as an internet box) has means for recording binary streams corresponding to video programs such as a hard disk. Hereinafter, to simplify, the assembly consisting of a digital decoder and a residential gateway will be referred to as a "receiver". The recording means of receivers are in general limited and do not make it possible to store a large volume of data.

One possible solution would be to use the network capacities of a receiver for saving binary streams on a remote recording server (referred to as a "remote server") in the internet. However, whereas a receiver has a reception rate compatible with the reception of a binary stream corresponding to a video program, the receiver has a very limited transmission rate, incompatible with transmission of a binary stream to a remote server in a reasonable time. The transmission rate is defined here as the theoretical maximum rate at which a receiver can transmit data.

The objective of the invention is to solve the problems mentioned above. The invention aims in particular to propose a method for remote recording of a video program enabling a plurality of receivers that are to record the same video program on a remote server to collaborate in order to record said video program, a receiving device and a server device able to implement said method and a video program recording system comprising said server device and at least one client device and implementing said method.

To this end, according to a first aspect of the present invention, the present invention relates to a method for recording a video program, said video program being received in the form of a binary stream by at least one receiver, referred to as the recording receiver, having to record the video program on a remote server, each recording receiver being connected to the remote server by a communication network and being characterised by a transmission rate, the binary stream being characterised by an encoding rate, characterised in that the method is implemented by each recording receiver and in that, for a recording receiver, the method comprises steps of obtaining a video program compression factor, of dividing the binary stream into a set of successive portions according to the compression factor obtained, of determining a subset of portions to be transmitted to the remote server from the set of successive portions according to an offset value and a difference value between portions corresponding to the compression factor, the offset value being a remainder of an integer division of a random number determined by the recording receiver by the compression factor, and of transmission of the portions in the determined subset of portions to the remote server in order to save thereof.

By distributing, when possible, the transmission of the portions between a plurality of recording receivers, the method makes it possible not to saturate the transmission rate of a recording receiver.

According to one embodiment, the compression factor is calculated according to the video program encoding rate, the transmission rate of the recording receiver, the number of recording receivers that are to record the video program, the number of connections allowed by the remote server and/or the number of video programs recorded simultaneously by the recording receiver.

In this way, the portions are transmitted with a transmission rate less than or equal to the transmission rate of the recording receiver, but may take into account other parameters for better adapting the transmission rate.

According to one embodiment, the compression factor is calculated by the recording receiver or by the remote server that transmits it to the recording receiver.

A calculation of the compression factor by the recording receiver makes it possible to ensure that the compression factor is indeed suited to the transmission rate of the recording receiver. Moreover, since the remote server has centralised knowledge of all the recording receivers that requested a program, the calculation of the compression factor by the remote server allows adaptation of the compression factor to a set of recording receivers.

According to one embodiment, the portions in the set of successive portions have a fixed size, according to a size measurement representing a number of binary data.

According to one embodiment, the portions in the set of successive portions have a fixed size, according to a size measurement representing a duration, each portion in the set of successive portions corresponding to an interval of time fixed in the video program.

Using portions of fixed size facilitates the step of reconstitution of the binary stream corresponding to the video program.

According to one embodiment, the portions in the set of successive portions are ordered according to their order of appearance in the binary stream and, when the subset of portions to be transmitted to the remote server is determined, the recording receiver selects portions in the set of successive portions spaced apart by a number of portions equal to the difference value between portions, running through the set of successive portions from a portion corresponding to the offset value.

A recording receiver then transmits only a subset of portions compatible with its transmission rate.

According to one embodiment, prior to the transmission of the portions in the subset of portions, the recording receiver transmits to the remote server a set of metadata representing the video program comprising the offset value, the compression factor and a value representing the size of the portions.

The set of metadata among other things enables the remote server to reassemble the portions.

According to one embodiment, when the recording receiver is informed by the remote server that another recording receiver having to record the video program is associated with the same offset value, the recording receiver interrupts the transmission of the portions.

In this way, unintentional multiple transmissions of the same portion are avoided.

According to one embodiment, the recording receiver also saves the portions in the set of successive portions or the portions in the subset of portions in a local storage unit of the remote server.

Saving the portions in a local storage unit enables the recording receiver for example to implement an application displaying the video program shifted in time.

In one embodiment, the recording receiver periodically sends a request for authorisation of deletion of portions to the remote server and, in the event of reception of a positive response to a request for authorisation of deletion of portions, deletes the recorded portions in the local storage unit.

By centralising a decision to delete portions at the remote server, the remote server is enabled to control the saving of the portions.

According to one embodiment, following the recording of at least part of the binary stream on the remote server, the recording receiver transmits to the remote server a request to display the video program, receives portions corresponding to the binary stream from the remote server and/or from at least one other recording receiver that saved the portions of the binary stream and reconstitutes the binary stream in order to display thereof.

The remote server is therefore not the only one to be able to respond to a request to display a recorded video program. In this way, overloading the remote server is avoided when possible.

According to a second aspect of the present invention, the present invention relates to a method for recording a video program, said video program being received in the form of a binary stream by at least one receiver, referred to as the recording receiver, having to record the video program on a remote server, each recording receiver being connected to the remote server by a communication network and being characterised by a transmission rate, the binary stream being characterised by an encoding rate. The method comprises, when it is implemented by the remote server, steps of obtaining at least one set of metadata, each set of metadata having been transmitted by a recording receiver and comprising an offset value, the offset value being a remainder of an integer division of a random number determined by the recording receiver by a compression factor obtained by the recording receiver, of seeking recording receivers associated with the same offset value in a set of recording receivers that transmitted metadata for the video program, of sending a transmission authorisation to at least one different recording receiver for each different offset value received, of receiving the binary stream in the form of portions from recording receivers that received a transmission authorisation, each recording receiver having divided the binary stream into a set of successive portions according to the compression factor, and having determined the portions that it transmits to the remote server from the set of successive portions according to the offset value and a difference value between portions corresponding to the compression factor, and of reconstituting the binary stream in order to store thereof in a storage unit of the remote server.

The remote server thus controls the recording of the binary stream corresponding to the video program to be recorded.

According to one embodiment, when, after reception of the portions from at least one recording receiver for each different offset value received, the absence of some portions prevents a reconstitution of the binary stream, the remote server transmits to at least one recording receiver information representing at least one missing portion, so as to cause the sending of each missing portion.

The remote server thus ensures that no portion is missing.

According to one embodiment, following the reception of a request for authorisation of deletion of portions from a recording receiver, the remote server transmits a deletion authorisation to the recording receiver comprising a list of portions to be deleted.

The remote server therefore controls the deletion of saved portions in local storage units of the recording receivers.

According to one embodiment, prior to an opening of a connection for at least one recording receiver for each different offset value received, the remote server waits for a predefined period.

The remote server thus ensures that all the recording receivers that are to record the video program have been identified.

According to one embodiment, when a portion is received, each portion is associated with information comprising information representing the position of the portion in the binary stream and information representing the recording receiver that saved the portion.

In one embodiment, when, following the reconstitution of the binary stream, the remote server receives a request to display the video program from a first recording receiver, the remote server constructs a list indicating, for at least one portion of the binary stream, at least one second recording receiver comprising a local storage unit in which said portion is saved.

In this way, when a video program is displayed, a recording receiver can request portions from another recording receiver rather than from the remote server, which avoids overloading the remote server.

According to a third aspect of the present invention, the present invention relates to a receiving device able to remotely record a binary stream representing a video program, characterised in that the receiving device comprises means for obtaining a compression factor for the video program, means for dividing the binary stream into a set of successive portions according to the compression factor obtained, means for determining a subset of portions to be transmitted to a remote server device from the set of successive portions according to an offset value and a difference value between portions corresponding to the compression factor, the offset value being a remainder of an integer division of a random number determined by the receiving device by the compression factor, means for transmitting portions in the subset of determined portions to the remote server device in order to saving thereof.

According to a fourth aspect of the present invention, the present invention relates to a server device able to record a binary stream representing a video program, the server device comprising means for obtaining at least one set of metadata, each set of metadata having been transmitted by a receiving device and comprising an offset value, the offset value being a remainder of an integer division of a random number determined by the receiving device by a compression factor obtained by the receiving device, means for seeking receiving devices associated with the same offset value in a set of receiving devices that transmitted metadata for the video program, means for sending the transmission authorisation to at least one different receiving device for each different offset value received, means for receiving the binary stream in the form of portions from the receiving device that received a transmission authorisation, each receiving device having divided the binary stream into a set of successive portions according to the compression factor, and having determined the portions that it transmits to the server device from the set of successive portions according to the offset value and a difference value between portions corresponding to the compression factor, and means for reconstituting the binary stream in order to store thereof in a storage unit of the server device.

According to a fifth aspect of the present invention, the present invention relates to a system for recording video programs comprising at least one receiving device according to the third aspect and a server device according to the fourth aspect.

According to a sixth aspect of the present invention, the invention relates to a computer program product containing instructions for the implementation, by a device, of the method according to the first aspect or the method according to the second aspect, when said program is executed by a processor of said device.

According to a seventh aspect of the present invention, the invention relates to storage means storing a computer program containing instructions for the implementation, by a device, of the method according to the first aspect or the method according to the second aspect, when said program is executed by a processor of said device.

Figure 1B:
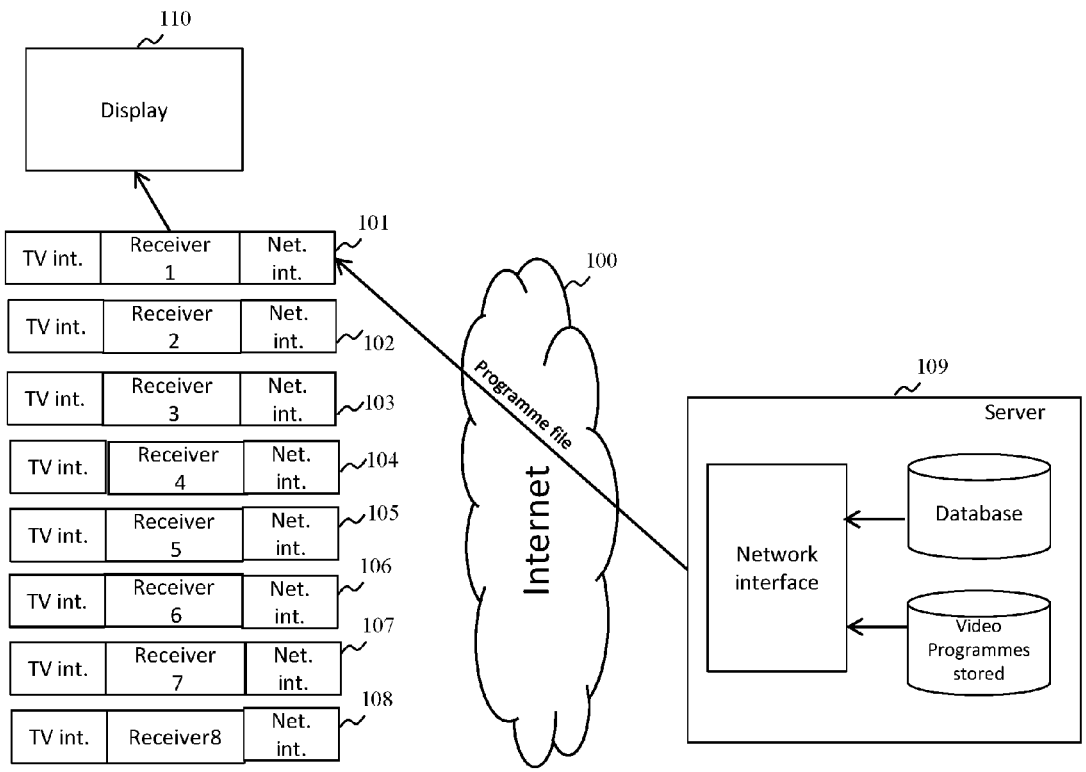
Figure 1C:
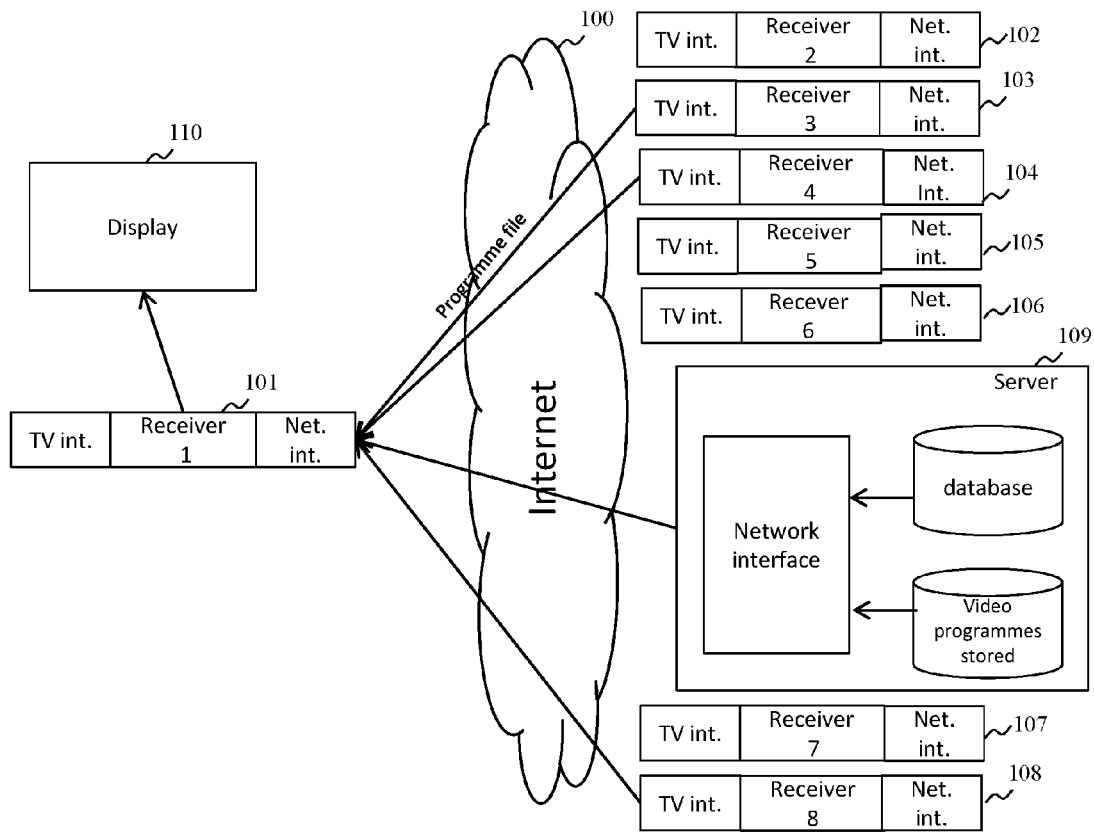
Figure 2A:
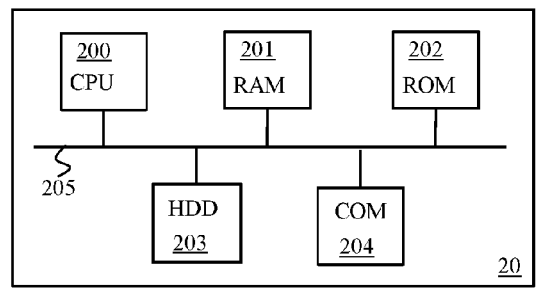
Figure 2B:
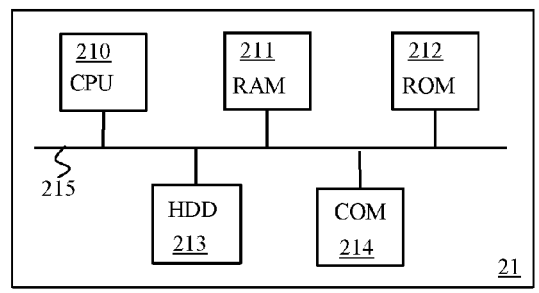
Figure 3:
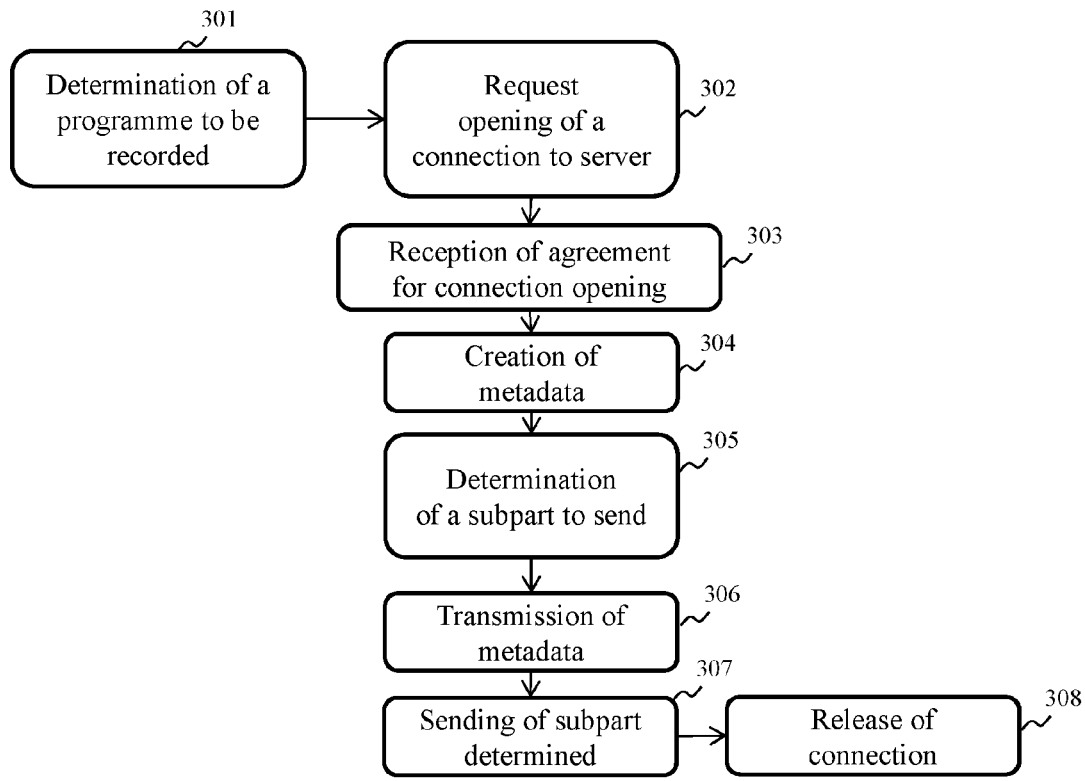
Figure 4:
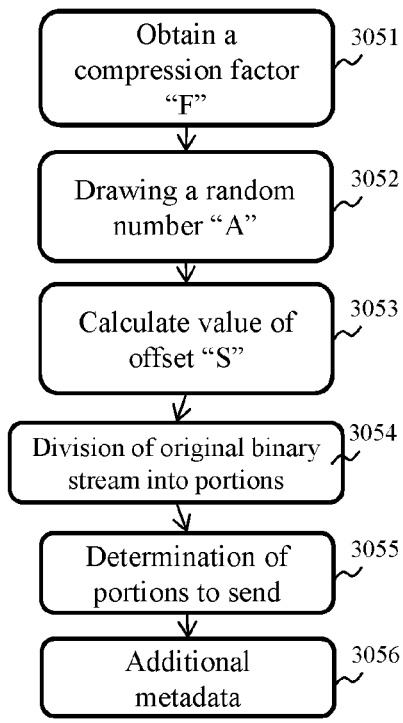
Figure 5:
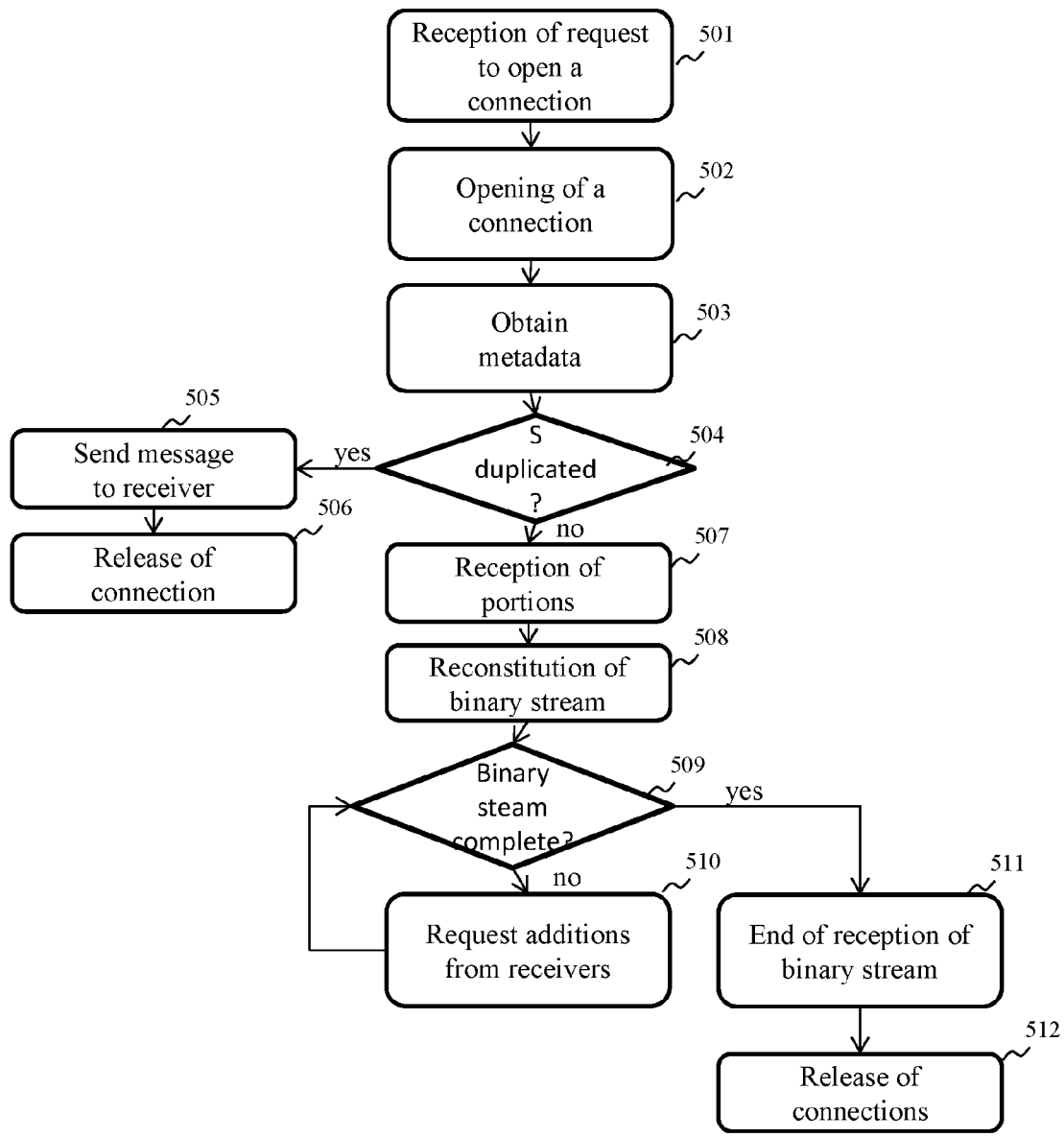
Figure 6:
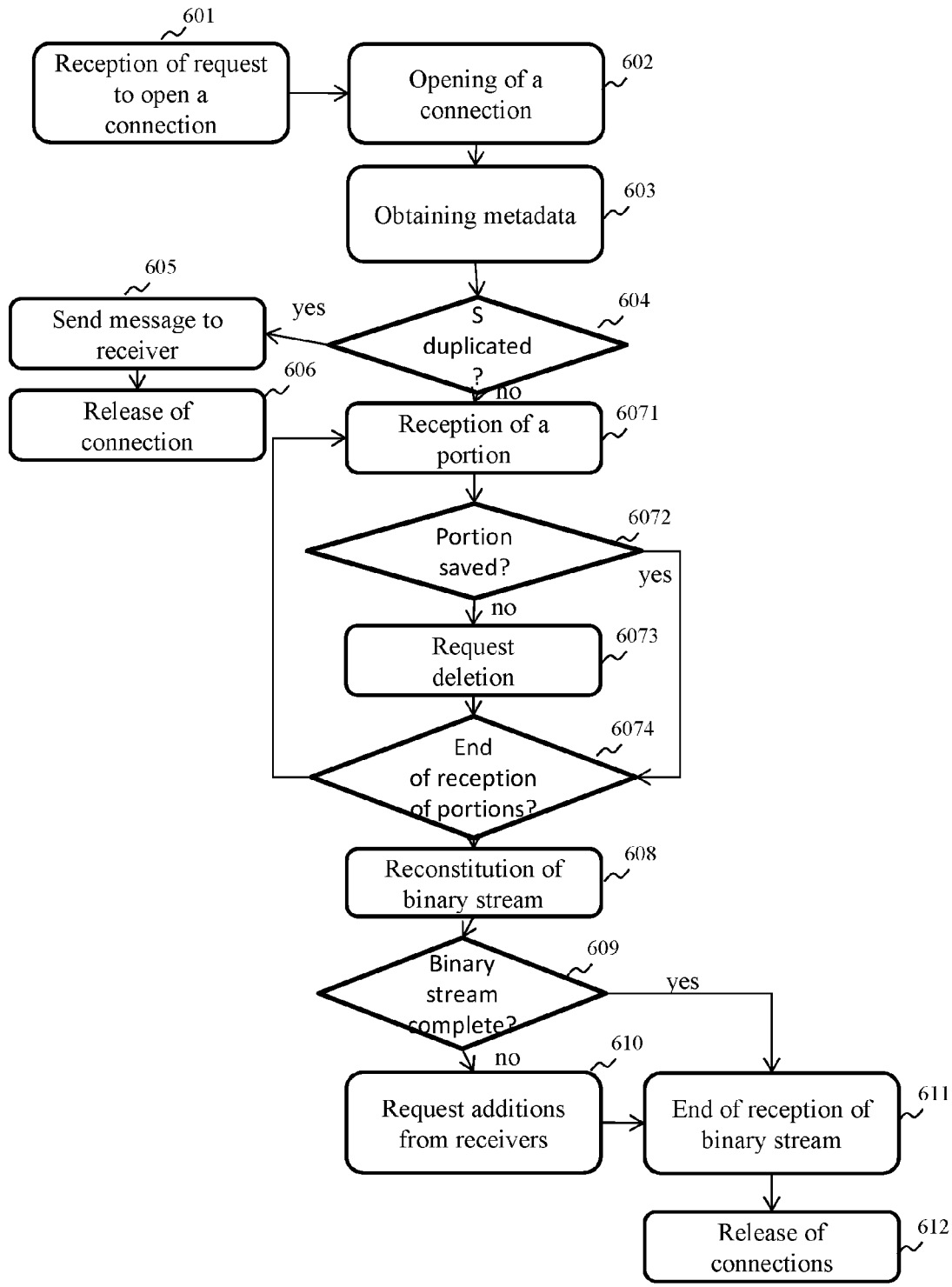
Figure 7:
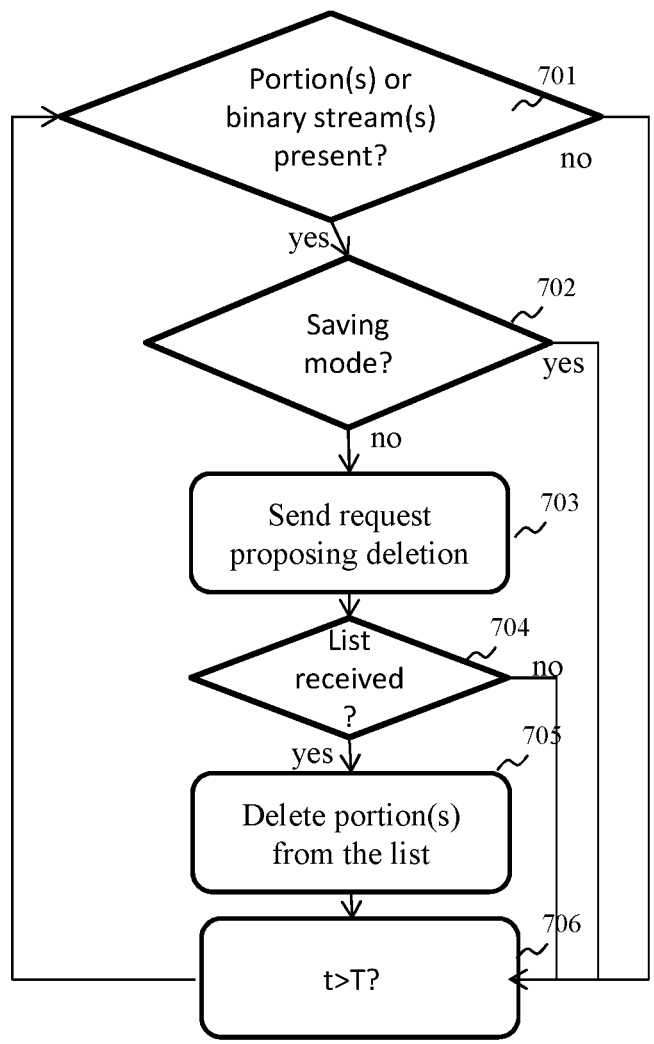
Figure 8:
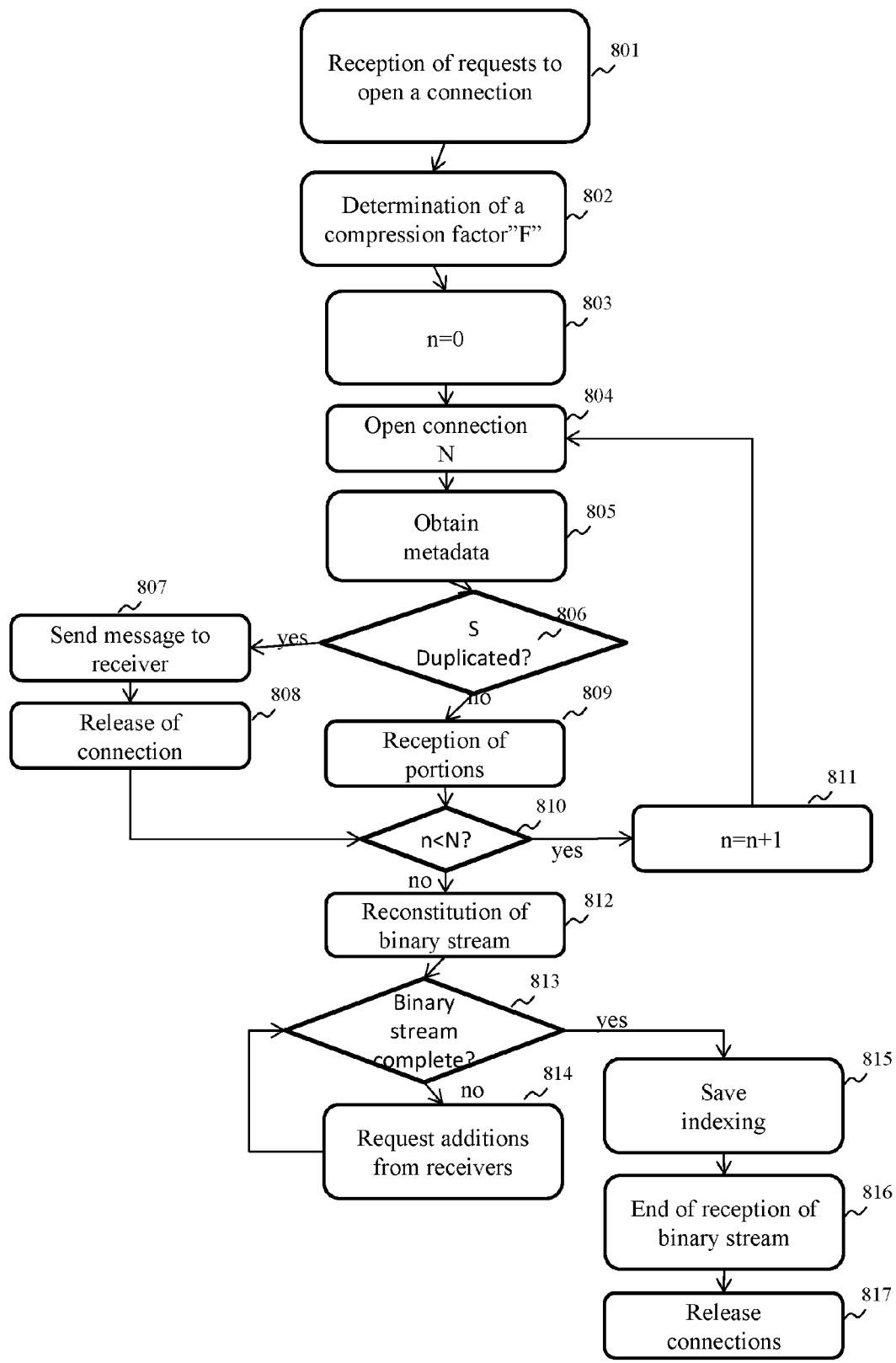
Figure 9:
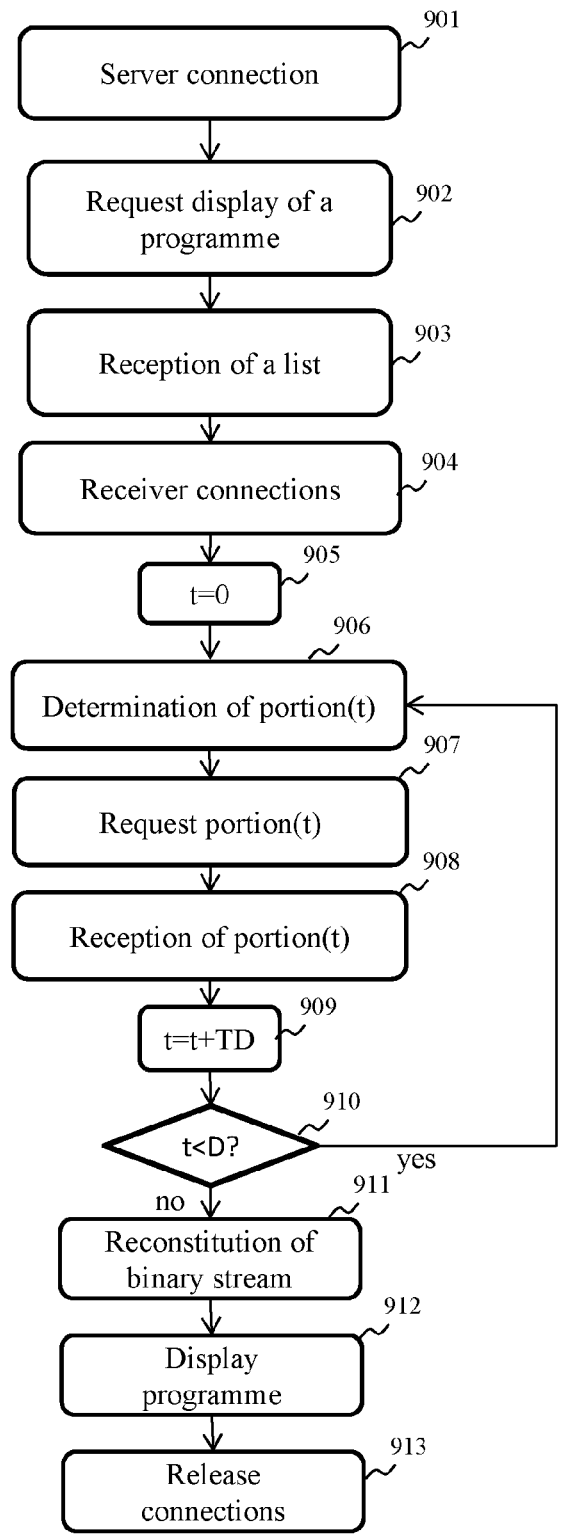
Figure 10:
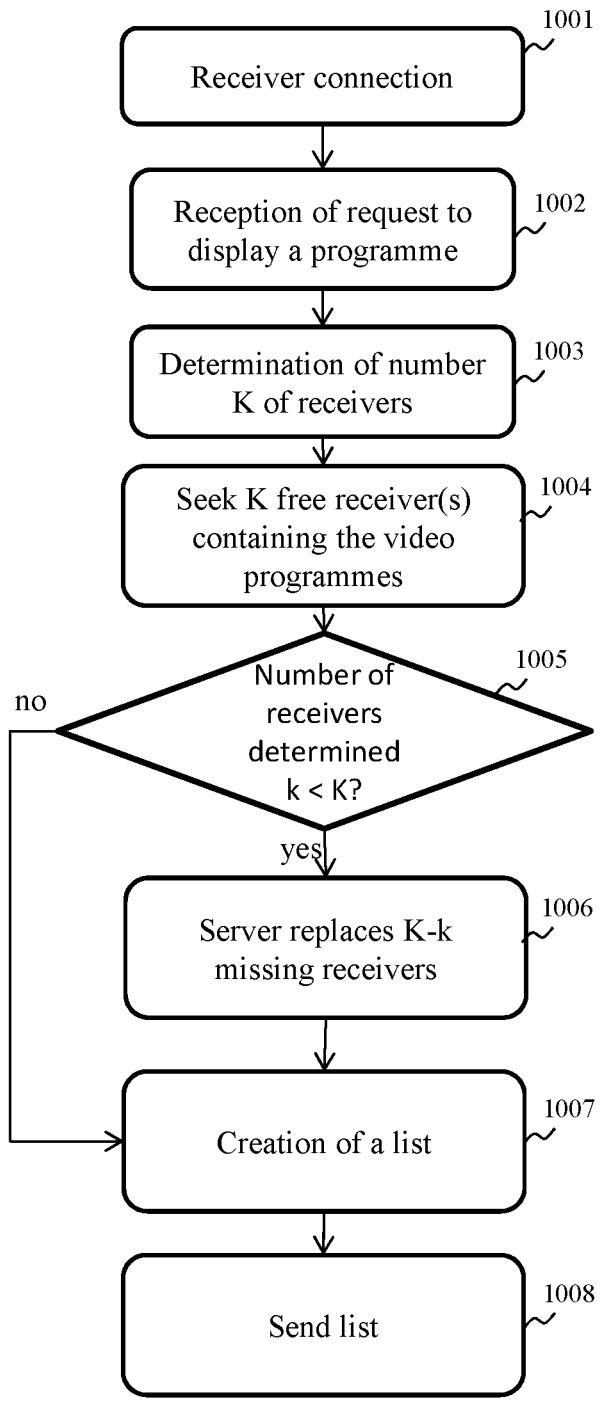

The features of the invention mentioned above, as well as others, will emerge more clearly from a reading of the following description of an example embodiment, said description being given in relation to the accompanying drawings, among which:

FIG. 1A illustrates schematically an example of implementation of a method for the remote recording according to the invention of a video program, in which a plurality of receivers collaborate in order to record the same video program on a remote server, FIG. 1B illustrates schematically a first example of implementation of a display of a video program saved on the remote server on a display connected to a receiver, FIG. 1C illustrates schematically a second example of implementation of a display of a video program saved on the remote server on a display connected to a receiver, FIG. 2A illustrates schematically an example of hardware architecture of a receiving device able to implement the remote recording method according to the invention, FIG. 2B illustrates schematically an example of hardware architecture of a remote server device able to implement the remote recording method according to the invention, FIG. 3 depicts schematically an example of a method for recording a video program remotely according to the invention implemented by a receiver, FIG. 4 depicts schematically a method implemented by a receiver for determining a subpart of a binary stream representing a video program to be sent to a remote server, FIG. 5 depicts schematically a first example of a method for recording a video program remotely according to the invention implemented by a remote server, FIG. 6 depicts schematically a second example of a method for recording a video program remotely according to the invention implemented by a remote server, FIG. 7 depicts schematically an example of a method for deleting portions of a binary stream representing a video program implemented by a receiver, FIG. 8 depicts schematically a third example of a method for recording a video program remotely according to the invention implemented by a remote server, FIG. 9 depicts schematically an example of a method implemented by a receiver providing a display on a display device connected to a receiver of a video program recorded on a remote server, FIG. 10 depicts schematically an example of a method implemented by a remote server providing a display on a display device connected to a receiver of a video program recorded on a remote server.

FIG. 1A illustrates schematically an example of implementation of a method for the remote recording according to the invention of a video program in which a plurality of receivers collaborate so as to record the same video program on a remote server. Hereinafter, the receivers able to implement the invention are referred to as "recording receivers". FIG. 1A depicts a network comprising a plurality of recording receivers 101 to 108 connected to a remote server 109 by a communication network 100 such as the internet. A video program provider (not shown) transmits a set of video programs to the recording receivers 101 to 108. Each recording receiver 101 to 108 has an interface for receiving video programs such as for example a TDT, ADSL, 3G or 4G interface. It is assumed here that the video program reception interfaces of the recording receivers 101 to 108 are all identical. In this way, the binary streams received by each recording receiver 101 to 108 are all identical, provided that no error affects these binary streams during transmission thereof. Each recording receiver 101 to 108 also has a network interface enabling it to communicate with a remote server 109 by means of the communication network 100. It is assumed here that all the recording receivers have an identical network interface and therefore that they have the same reception rate and the same transmission rate. Moreover, each recording receiver 101 to 108 has a storage unit such as a hard disk for saving the binary streams corresponding to video programs.

The remote server 109 has a network interface for communicating with the recording receivers 101 to 108 by means of the communication network 100, a storage means such as one or more hard disks for storing binary streams corresponding to video programs and a video program database comprising, for each binary stream, descriptive data (or metadata).

In the example in FIG. 1A, the recording receivers 101 to 108 must record the same video program on the remote server. To do this, according to a method that is described below in relation to FIG. 3, each recording receiver 101 to 108 transmits portions of the binary stream corresponding to the video program to the remote server, which proceeds with a reconstitution of the binary stream. In parallel to the transmission of the portions, each recording receiver 101 to 108 transmits metadata describing the video program and the portions. The reconstituted binary stream is stored in the storage unit of the remote server. The metadata are stored in the video program database and associated with the reconstituted binary stream.

FIG. 2A illustrates schematically an example of hardware architecture of a recording receiving device (referred to as a "recording receiver") 20 able to implement the remote recording method according to the invention. The recording receiver 20 is identical to the recording receivers 101 to 108. The recording receiver 20 comprises, connected by a communication bus 205: a processor or CPU (central processing unit) 200; a random access memory (RAM) 201; a read only memory (ROM) 202; a storage unit 203 or a storage medium reader, such as an SD (secure digital) card reader or USB (universal serial bus) keys or a hard disk drive (HDD); at least one interface 204 for exchanging data with other devices. The storage unit of the recording receiver 20 is of small size and makes it possible to store only a limited number of binary streams. In one embodiment, the interface 204 uses the video program reception interface, the network interface and an interface for communication with a client device such as a computer, a tablet or a smartphone. The interface 204 may for example comprise an ADSL interface receiving among other things binary streams corresponding to video programs transmitted by a video program provider. Moreover, the interface 204 allows exchanges of data with the remote server 109 and other recording receivers. A user can, in addition, use the interface 204 for controlling the recording receiver 20 from a client device and for example selecting a video program to be recorded.

The processor 200 is capable of executing instructions loaded into the RAM 201 from the ROM 202, from an external memory (not shown) from a storage medium or from a communication network. When the recording receiver 20 is powered up, the processor 200 is capable of reading instructions from the RAM 201 and executing them. These instructions form a computer program causing the implementation, by the processor 200, of all or some of the algorithms and steps described in relation to the recording receiver 20 and FIGS. 3, 4, 7 and 9.

FIG. 2B illustrates schematically an example of hardware architecture of a remote server device (referred to as a "remote server") 21 able to implement the remote recording method according to the invention. The remote server 21 is identical to the remote server 109. The remote server 21 comprises, connected by a communication bus 215: a processor or CPU (central processing unit) 210; a random access memory (RAM) 211; a read only memory (ROM) 212; a storage unit 213 or a storage medium reader, such as an SD (secure digital) card reader or USB (universal serial bus) keys or a hard disk drive (HDD); at least one interface 214 for exchanging data with other devices. The storage unit 213 of the remote server 21 is of large size and makes it possible to store a large number of binary streams and a video program database associating metadata with each binary stream recorded. In one embodiment, the storage unit 213 may be a remote storage unit external to the remote server 21 and connected to the remote server 21 by a communication network. The interface 214 makes it possible to use a plurality of connections in parallel and thus to exchange data with a plurality of recording receivers simultaneously.

The processor 210 is capable of executing instructions loaded in the RAM 211 from the ROM 212, from an external memory (not shown), from a storage medium, or from a communication network. When the remote server 21 is powered up, the processor 210 is capable of reading instructions from the RAM 211 and executing them. These instructions form a computer program causing the implementation, by the processor 210, of all or some of the algorithms and steps described in relation to the remote server 21 and FIGS. 5, 6, 8 and 10.

All or some of the algorithms and steps described hereinafter can thus be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 3 depicts schematically an example of a method for the remote recording of a video program according to the invention, implemented by a recording receiver. In this example we focus on the recording receiver 101, which implements the method in FIG. 3. However, we will consider in this example that the recording receivers 102 to 108 implement the same method simultaneously. The method begins with a step 301, during which a user selects a video program to be recorded on the remote server 109. In a step 302, the recording receiver 101 sends a request to the remote server requesting the opening of a connection. For example, the recording receiver 101 requests the opening of an HTTPS (hypertext transfer protocol secure) connection.

In a step 303, the recording receiver 101 receives from the remote server 109 an agreement for opening the connection. The connection is then opened.

In a step 304, the recording receiver 101 creates metadata for example in an XML (extensible mark-up language) format. These metadata comprise information representing a start instant of the video program selected, information representing an end instant of the video program selected, information for identifying a name of the program, and information representing a transmission channel used by the video program provider for transmitting the video program to the recording receivers 101 to 108.

Since the transmission rate of the recording receiver 101 is insufficient to allow transmission of the binary stream corresponding to the chosen video program to the remote server 109, the recording receiver 101 sends only a subpart of this binary stream. To do this, the recording receiver 101 determines, during a step 305, which subpart of the binary stream to send to the remote server 109 in accordance with the method described in relation to FIG. 4. An objective of step 305 is to prevent all the recording receivers transmitting the same subpart.

In a step 306, the receiver 101 supplements the metadata with information representing the subpart of the binary stream determined during step 305.

In a step 307, the recording receiver 101 begins a transmission of the subpart of the binary stream determined during step 305 to the remote server 109.

The transmission continues as long as the subpart determined is not completely transmitted or as long as the remote server has not requested the stop of the transmission. Following step 307, the recording receiver 101 ends the connection.

FIG. 4 shows schematically a method, implemented by the recording receiver 101, for determining a subpart of a binary stream representing a video program to be sent to a remote server corresponding to step 305 of FIG. 3. The method begins with a step 3051 during which the recording receiver 101 obtains a compression factor F. In one embodiment, the compression factor F is calculated by the recording receiver 101 by dividing the transmission rate of the recording receiver 101 by an encoding rate of the video program. We assume here that a recording receiver knows the encoding rate of each video program that it receives.

In a step 3052, the recording receiver 101 proceeds with a computation of a non-zero random positive integer number A.

In a step 3053, the recording receiver 101 determines an offset value S that is explained hereinafter. The offset value S is calculated as a remainder of an integer division of the random number A by the compression factor F.

In a step 3054, the recording receiver 101 divides the binary stream corresponding to the video program to be recorded into a set of successive portions, the portions in the set of successive portions being ordered in an order of appearance of the portions in the binary stream. In one embodiment, the recording receiver 101 divides the binary stream into portions of fixed size TB, according to a measurement of size representing a number of binary data, i.e. a number of bits. This size is defined arbitrarily and is identical on all the recording receivers.

In a step 3055, the recording receiver 101 determines which portions in the set of successive portions must be sent to the remote server 109. To do this, the portions in the set of successive portions are parsed in their order of appearance in the binary stream. The recording receiver 101 associates each portion with an index corresponding to the position of the portion in the set of successive portions. The recording receiver 101 selects portions in the set of successive portions spaced apart by a number of portions equal to F by running through the set of successive portions from the portion of index S, i.e. the recording receiver 101 selects the portions of index $I=S+F \cdot x$ where x is a positive or nil integer such that I is less than or equal to a value N equal to the total number of portions included in the binary stream. In this way, the recording receiver 101 sends only a subset of N/F portions in the set of successive portions.

In a step 3056, the recording receiver 101 supplements the metadata by inserting therein information representing the size of each portion, information representing the offset value S and, if the recording receiver 101 is at the origin of the calculation of the compression factor F, a value representing the compression factor F.

In one embodiment, the recording receiver 101 associates with each portion a metadata file comprising the index of the portion in the set of successive portions and the maximum index of the portions. Each metadata file is sent to the remote server 109 when the corresponding portion is sent.

When a number of recording receivers (here 8) is equal to the compression factor F and each recording receiver 101 to 108 has calculated a different offset value S, the recording receivers act in a complementary manner and all the portions constituting the binary stream are transmitted to the remote server 109.

If recording receivers among the recording receivers 101 to 108 calculate an identical offset value S, the remote server 109 prevents some recording receivers from continuing their transmission of portions in order to keep only one recording receiver that has calculated said offset value S, in accordance with a method described in relation to FIG. 5. This case may occur in particular when the number of recording receivers is greater than the compression factor F.

If the number of recording receivers is less than the compression factor F, there is a risk that the remote server 109 might not receive all the portions corresponding to the video program to be recorded. In this case, according to a method described in relation to FIG. 5, the remote server 109 will request recording receivers to transmit the missing portions.

In one embodiment, the recording receivers 101 to 108 do not calculate the compression factor F. The determination of the compression factor F is then left to the remote server 109, which will transmit the compression factor F to the recording receivers 101 to 108. An example of a method for determination of the compression factor F by the remote server 109 is described in relation to FIG. 8.

The metadata files associated with each portion have a not insignificant transmission rate added to a transmission rate of the portions themselves. In one embodiment, to reduce the transmission rate, the recording receiver 101 does not associate each portion with a metadata file. In this embodiment, we shall see subsequently that the remote server 109 must analyse each portion in order to determine in what order to reconstitute the binary stream.

In one embodiment, at least one recording receiver among the recording receivers 101 to 108, for example the recording receiver 101, saves in its storage unit 203 portions in the set of successive portions or portions in the subset of N/F portions in the set of successive portions. These portions may for example be kept temporarily in order to implement a time-shifting service.

In one embodiment, the recording receiver 101 having saved portions in its storage unit 203, implements a local policy of deleting the saved portions, for example by deleting the oldest portions.

In one embodiment, the recording receiver 101 collaborates with the remote server 109 in order to determine which saved portions in its storage unit can be deleted in accordance with methods described in relation to FIGS. 6 and 7.

In one embodiment, the recording receiver 101 divides the binary stream into portions of fixed size TD in accordance with a size measurement representing a duration. This size is defined arbitrarily and is identical on all the recording receivers. This embodiment requires an analysis of the binary stream corresponding to the video program to be saved in order to find images included in the binary stream. The analysis of the binary stream can be based for example on a search for timestamps in the binary stream, such as presentation timestamps (PTSs) or decoding timestamps (DTSs) present in the MPEG-TS encapsulation format. Each image in a binary stream is associated with a PTS marker and a DTS marker indicating respectively an instant of presentation of the image and an instant of decoding of the image. In one embodiment, the division of the binary stream into portions consists of dividing the binary stream into successive portions of duration TD on the basis of the PTS stamps associated with the images.

In one embodiment, a recording receiver can record a plurality of video programs simultaneously. The compression factor F must then be adapted to the number of programs to be recorded. For example, if a plurality of programs are recorded simultaneously, the compression factor F is the result of a division of the transmission rate of the recording receiver 101 by a sum of the encoding rates of each video program to be recorded.

FIG. 5 shows schematically a first example of a method for remote recording of a video program implemented by the remote server 109. In a step 501, the remote server 109 receives a connection request from one of the recording receivers 101 to 108, for example the recording receiver 101. In a step 502, the remote server 109 enables connection with the recording receiver 101.

In a step 503, the remote server 109 receives the metadata transmitted by the recording receiver 101 during step 306. The remote server 109 then obtains a description of the video program and in particular the information representing the start time of the video program, the information representing the end time of the video program, and the offset value S calculated by the recording receiver 101. If it has not already calculated it from metadata received from another recording receiver having to record the same video program, the remote server 109 calculates a duration D of the video program from the information representing the start time of the video program and the information representing the end time of the video program.

During a step 504, the remote server 109 compares the offset value S received with other offset values S possibly received from other recording receivers (102 to 108) that are to record the same video program. If it turns out that a recording receiver among the recording receivers 102 to 108 has already sent the same offset value S, the remote server 109 sends a message to the recording receiver 101 indicating to it to cease transmission of its portions during a step 505 and releases the connection opened during a step 502 in a step 506. All the portions already sent by the recording receiver 101 are rejected by the remote server 109.

If no other recording receiver has transmitted the offset value S, the remote server 109 implements a step 507. During step 507, the remote server 109 receives the portions transmitted by the recording receiver 101.

In a step 508, the remote server 109 begins to reconstitute the binary stream corresponding to the video program. To do this, all the portions received for the video program from the recording receivers 101 to 109 are put end to end in order to form a file. In one embodiment, the remote server 109 orders the portions using the metadata file associated with each portion and comprising the index of the portion. Moreover, during step 508, the remote server 109 saves the metadata describing the video program in its video program database and, for each portion, information making it possible to identify which recording receiver transmitted the portion.

In a step 509, the remote server 109 checks that all the portions have been received. For this purpose the remote server 109 checks that all the indices from the index "1" as far as the maximum index of the portions have indeed been received. If such is the case, the remote server 109 declares that the binary stream corresponding to the video programs has been reconstituted during a step 511 and releases each connection connecting it to the recording receivers 101 to 108 during step 512.

If it turns out that indices are missing, the remote server 109 requests at least one of the recording receivers 101 to 108 to transmit the portions corresponding to the missing indices during a step 510. Step 510 is followed by step 509, already explained.

The request to retransmit portions corresponding to the missing indices can be done in various ways.

In one embodiment, the remote server 109 sends a list of missing indices to one of the recording receivers 101 to 109, which transmits the corresponding portions.

In another embodiment, knowing that the remote server 109 must receive F different offset values to be able to reconstitute the binary stream corresponding to the video program, if fewer than F different values have been received the remoter server 109 determines which offset value or values S is or are missing. The missing offset values S are transmitted to at least one recording receiver among the recording receivers 101 to 108 so that it or they can determine which portions must be sent. It is less expensive in terms of rate to transmit one or more offset values than to transmit a list of indices of portions.

FIG. 6 shows schematically a second example of a method for recording a video program remotely implemented by the remote server 109. The method described in relation to FIG. 6 supplements the method described in relation to FIG. 5 by adding the steps implementing a policy of deletion of portions saved in the storage unit 203 of the recording receiver 101. This method comprises steps 601 to 606 and 608 to 612 respectively identical to steps 501 to 506 and 508 to 512. Step 507 is replaced by steps 6071, 6072, 6073 and 6074. In this method, it is assumed that the metadata received during step 603 comprise information indicating whether portions are saved in the storage unit 203 of the recording receiver 101 and, if such is the case, which portions are saved. These metadata are stored in the video program database of the remote server 109. For example, the metadata file associated with each portion contains information indicating whether or not the portion is saved by the recording receiver that sent this portion.

During step 6071, the remote server 109 receives a portion. In a step 6072, the remote server 109 determines, by consulting the file associated with the portion, whether this portion is saved in the storage unit 203 of the recording receiver 101. If such is not the case the remote server 109 determines during step 6074 whether it has received all the portions that the recording receiver 101 must send. If all the portions that are to be sent by the recording receiver 101 have been received, the remote server 109 implements step 608. Otherwise the recording receiver 101 awaits a new portion and returns to step 6071 when a new portion is received.

If during step 6072 the remote server 109 determines that the portion has been saved by the recording receiver 101, the remote server 109 sends, during step 6073, a request to delete the portion concerned to the recording receiver 101 in order to cause the deletion of the relevant portion from the storage unit 203 of the recording receiver 101. The remote server 109 then implements step 6074.

FIG. 7 depicts schematically an example of a method for deleting portions of a binary stream representing a video program implemented by at least one of the recording receivers 101 to 108, for example the recording receiver 101. The method of FIG. 7 is an alternative to the deletion method described in relation to FIG. 6. The method of FIG. 7 was compatible with the method described in relation to FIG. 5 and can be implemented at any moment by the recording receiver 101 after having started the sending of the portions to the remote server 109. The recording receiver 101 can for example implement the method of FIG. 7 after the recording of the binary stream corresponding to the video program on the remote server 109. Moreover, as in the method of FIG. 6, it is assumed that the metadata received during step 503 comprise information indicating for each portion whether this portion is saved in the storage unit 203 of the recording receiver. These metadata were previously stored in the video program database of the remote server 109 when the portions were received.

In a step 701, the recording receiver 101 checks whether portions are stored in its storage unit 203. If no portion is stored in the storage unit 203, the recording receiver 101 waits for a period T in a step 706. Step 706 makes it possible to check periodically, with a period T, whether portions can be deleted from the storage unit 203.

If portions are present in the storage unit 203, the recording receiver 101 checks whether or not it is in a saving mode during a step 702. Saving mode is an operating mode of the recording receiver 101 in which the recording receiver 101 is obliged to store portions in the set of successive portions or portions in the subset of portions in the set of successive portions. In this mode, the portions stored in the storage unit 203 cannot be deleted. Saving mode can be activated for example by a user by means of a client device connected to the recording receiver 101. If the recording receiver 101 is in saving mode, the recording receiver implements step 706.

If the recording receiver is not in saving mode, in a step 703, the recording receiver 101 sends a deletion enable request to the remote server 109. If the recording receiver 101 does not receive any response to its request after a predefined period less than T, the recording receiver 101 implements step 706. If on the other hand the recording receiver 101 receives a response to its deletion request, the recording receiver 101 deletes, in a step 705, portions identified in a list of portions transmitted by the recording receiver 101 in the response. The recording receiver 101 next implements step 706.

For its part, the remote server 109 can receive a deletion enable request from one of the recording receivers 101 to 109 at any time after the start of the recording of the binary stream corresponding to the program to be recorded. When it receives this request, it determines which portion or portions can be deleted. For example when the deletion request comes from the recording receiver 101, the remote server 109 uses the video program database in order to identify the portions sent by the recording receiver 101 and, among these portions, the portions saved in the storage unit 203 of the recording receiver 101. Then, according to a predefined criterion, the remote server 109 determines which portions can be deleted. The predefined criterion that may for example be a time criterion. The remote server 109 can thus send a list of portions corresponding to the oldest portion.

In one embodiment, the predefined criterion is a criterion of redundancy of saving of the portions. In this embodiment, a plurality of recording receivers among the recording receivers 101 to 108 may store identical portions. For example, when the deletion request emanates from the recording receiver 101, the remote server 109 uses the video program database for identifying the portions sent by the recording receiver 101 and, among these portions, the portions saved in the storage unit 203 of the recording receiver 101 that are also saved in the storage unit 203 of at least one other recording receiver among the recording receivers 102 to 108. The remote server 109 can then send a list of portions to be deleted to the recording receiver 101 corresponding to portions stored in the storage unit 203 of at least one other recording receiver among the recording receivers 102 to 108.

FIG. 8 depicts schematically a third example of a method for the remote recording of a video program according to the invention implemented by the remote server 109. In the method in FIG. 8, it is the remote server 109 that determines the compression factor F. In a step 801, the remote server 109 receives connection opening requests. It is assumed that, for implementation of the method in FIG. 8, when a connection opening request is sent during step 302, each recording receiver transmits to the remote server 109 information representing the video program that is to be recorded. During step 801, the remote server 109 waits for a predefined period D before continuing the method in order to obtain connection requests for the same video program from a maximum number of recording receivers. The predefined period D is a period determined for example during requests for recording of past video programs. This predefined period D makes it to possible to ensure that all the connection requests that could be made by recording receivers for recording the same video program would be received by the remote server 109 before the remote server 109 determines the compression factor F. Each connection request corresponding to a recording receiver having to record a video program, by counting the number of connection requests the remote server 109 can determine a total number Nmax of recording receivers that are to record the same program. Prior knowledge of a number Nmax of recording receivers that are to record the same video program makes it possible to determine a compression factor F suited to the number Nmax of recording receivers that are to record the same video program and thus better to distribute the sending of portions between the recording receivers. In this way the portions can be transmitted with a transmission rate lower than the transmission rate of the recording receivers.

In a step 802, the remote server 109 determines a compression factor F. It is assumed here that the remote server 109 knows a mean rate of a video program DV and the transmission rate of the recording receivers DR. The remote server 109 than chooses a compression factor F lying between DV/DR and Nmax. However, if Nmax is greater than the number MAX_C of connections accepted by the remote server 109, the remote server 109 chooses a compression factor between DV/DR and MAX_C. Moreover, during step 809, the remover server 109 chooses a number N of recording receivers from the Nmax recording receivers that are to record the same video program, the number N being less than or equal to MAX_C. In one embodiment N=F.

In a step 803, the remote server 109 initialises a variable n to "0". The variable n is used to run through the N recording receivers chosen. In a step 804, the remote server 109 opens a connection with the nth of the N recording receivers. During a step 805, the remote server 109 receives metadata for the nth of the N recording receivers. Step 805 is identical to step 503.

In a step 806, the remote server 109 determines whether the offset value S received in the metadata is already used for another recording receiver. Step 806 is identical to step 504.

If the offset value S is already used, step 806 is followed by a step 807 and a step 808, respectively identical to steps 505 and 506.

Step 808 is followed by a step 810 during which the remote server 109 tests whether a connection has been opened for the N recording receivers. If such is not the case, the variable n is incremented by one unit during a step 811 and the remote server 109 once again implements step 804.

If the offset value S is not already used, during a step 809 identical to step 507 the remote server 109 receives portions from the recording receiver to which the nth connection relates. Step 809 is followed by step 810.

When the N connections have been opened and the portions corresponding to these connections have been received, the remote server 109 proceeds, during a step 812, with the reconstitution of the binary stream corresponding to the video program. In the example method described in relation to FIG. 8, we assume that the portions have been transmitted without a metadata file indicating the position of the portions in the binary stream. In addition, we assume that the portions are of fixed size TD, according to the measurement of the size corresponding to a period. In this case, the remote server 109 must proceed with an analysis of each portion in order reconstitute the binary stream. As during the division of the binary stream into portions based on the fixed size TD, the reconstitution may be based on the search for PTS stamps in the portions. The portions are then ordered according to the PTS stamps that they contain and assembled to reconstitute the binary stream.

In a step 813, the remote server 109 determines whether the binary stream is complete. To do this, the remote server 109 calculates the duration of the video program using the information representing the start instant of the video program selected and the information representing the end instant of the video program selected, and then runs through all the portions received in order to determine, using the PTSs, whether this duration is covered continuously by the portions.

If all the portions have been received, during a step 815 the remote server 109 stores in its video program database, for each portion, information representing a period covered by the portion in the video program, such as for example a start instant of the portion and an end instant. Moreover, during step 815, the remote server 109 records the reconstituted binary steam in its storage unit 213.

In a step 816, the remote server 109 notes that the binary stream is entirely saved and that all the metadata relating to the video program have been saved in the database. In a step 817 the connections opened during step 814 are released by the remote server 109.

If it turns out that portions are missing during step 813, the remote server 109, during a step 814, makes requests for the missing portions for example by transmitting to at least one of the recording receivers 101 to 108 information representing periods of time in the video program not covered by the portions received.

Up until then we have considered that the binary steams corresponding to video programs received by the recording receivers were received without errors. It is however usual for errors to occur during the transmission of these binary streams between the video program supplier and the recording receivers. Two types of error can occur in a binary stream. The errors may result in losses of portions of the binary stream or the reception of portions of binary stream comprising bit reversals. When the binary stream is divided into portions, a recording receiver that has received a bit stream affected by errors risks creating portions containing errors.

In one embodiment, each recording receiver is able to detect errors in a binary stream that it receives. For example, each binary stream portion received by a recording receiver is associated with a checksum for determining whether the portion is erroneous. In this case, the recording receiver creates portions solely for the binary stream portions received that do not contain any errors. As seen for example with steps 813 and 814, the remote server 109 is able to detect missing portions and to request additions.

In one embodiment, the recording receivers are not capable of detecting errors. In this embodiment, the remote server 109 is able to detect errors in the portions received. It is assumed in this embodiment that each portion corresponds to an integer number of images and that each image is decomposed into a number of macroblocks or CTBs (coding tree blocks) that is fixed and known to the remote server 109. It may be noted that the term macroblock (and respectively the term CTB) is terminology used in the H.264/AVC standard (and respectively the H.265/HEVC standard) corresponding to a square or rectangular block of pixels of an image. For each image received in a portion, the remote server 109 comprises a number of decoded macroblocks or CTBs. When the number of decoded macroblocks or CTBs is different from the fixed number of macroblocks or CTBs, the remote server 109 declares that the portion contains an error. This received portion containing errors is then rejected by the remote server 109 and re-requested of a recording receiver.

In one embodiment, the remote server 109 can create redundancy in the portions received to avoid having to re-request erroneous portions. In this embodiment, the remote server 109 enables more recording receivers to transmit portions than necessary by choosing, during step 802, N>FI recorded receivers among the Nmax recording receivers that are to record the same video program. In one embodiment N=2·F. In this way some recording receivers use the same offset value S and send identical portions. The remote server 109, when it receives identical portions, seeks an error-free portion among the portions received. As soon as an error-free portion is found, only this portion is kept by the remote server 109, and the portions identical to this portion are rejected.

One objective of a recording of a video program is to be able to view the video program later. FIG. 1B illustrates schematically a first example of use of a viewing of a video program saved on the remote server 109 on a display 110 connected to the recording receiver 101. In this example, the recording receiver 101 has made a request to view a video program to the remote server 109. In response, according to method described in relation to FIGS. 9 and 10, the remote server 109 transmits a list containing, for each portion of the binary stream corresponding to the video program, information indicating to the recording receiver 101 where the portion should be requested among the recording receivers 102 to 108 and the remote server 109. In this example, only the remote server 109 has the portions. The recording receiver 101 therefore receives all the portions from the remote server 109.

FIG. 1C illustrates schematically a second example of implementation of a viewing of a video program saved on the remote server 109 on the display 110 connected to the recording receiver 101. In this second example, the recording receivers 103, 104 and 108 have kept portions of the binary stream corresponding to the video program to be viewed. The remote server 109 therefore indicates to the recording receiver 101 which portions can be obtained from the recording receivers 103, 104 and 108. The missing portions that have not been kept by the recording receivers 103, 104 and 108 are obtained from the remote server 109. The recording receiver 101 therefore receives all the portions from the recording receivers 103, 104 and 108 and from the remote server 109, which makes it possible not to overload the remote server 109.

FIG. 9 depicts schematically an example of a method implemented by a recording receiver, for example the recording receiver 101, affording display on the display device 110 connected to the recording receiver 101 of a video program recorded on the remote server 109. It is assumed for the method of FIG. 9, but also for the method of FIG. 10, that some recording receivers among the recording receivers 102 to 108 have kept portions in their storage unit 203 and that the remote server 109 has kept in its database for each portion information indicating which among the recording receivers 101 and 108 and the remote server 109 has the portion. In one embodiment the remote server 109 systematically possesses all the portions.

In a step 901, the recording receiver 101 opens a connection with the remote server 109. In a step 902, the recording receiver 101 requests the display of a video program from the remote server 109. In a step 903, the recording receiver 101 receives a list indicating, for each portion of the binary stream corresponding to the video program to be displayed, information indicating to which period of the video program the portion corresponds or the index of the portion and information indicating where to find the portion.

In a step 904, if the list received by the recording receiver 101 indicates that some portions will have to be requested from at least one other recording receiver among the recording receivers 102 to 108, for example the recording receiver 102, the recording receiver 101 opens a connection with at least one other recording receiver, here the recording receiver 102.

In a step 905, the recording receiver 101 starts a clock by fixing a variable t representing the time at 0. The variable t represents an instant in the video program.

In a step 906, the recording receiver 101 determines who has the portion corresponding to the instant t using the list received during step 903. During a step 904, the recording receiver 101 sends a request for the portion corresponding to the instant t to the recording receiver 101 or to the remote server 109 according to the results of step 906. During a step 908, the recording receiver 101 receives the requested portion.

During a step 909, the recording receiver 101 passes to the following portion by increasing the value of the instant t by the value of the size of a portion TD. If the instant t has not reached the duration D of the video program during a step 910, the recording receiver 101 returns to step 907.

If the instant t is greater than the duration D of the program, the recording receiver 101 passes to the reconstruction of the binary stream during a step 911 and displays a video program during a step 912.

During a step 913, which may follow step 912 or be implemented during steps 911 and 912, the recording receiver 101 releases the connection or connections opened during step 901 (and step 904).

FIG. 10 shows schematically an example of a method implemented by the remote server 109 allowing display on the display device 110 connected to the recording receiver 101 of a video program recorded on the remote server 109.

In a step 1001, the remote server 109 opens a connection with a recording receiver, for example the recording receiver 101. In a step 1002, the remote server 109 receives a request to display a program. To do this, the recording receiver 101 has transmitted information representing the program to be displayed to the remote server 1109.

In a step 1003, the remote server 109 determines a number K of recording receivers to be used for transmitting the portions to the recording receiver 101. The choice of the number K of recording receivers can be based on a criterion of distribution of transmission load between the recording receivers. The objective is not to monopolise the whole of the transmission rate of a recording receiver so that another receiver can display a video program, but rather to use a small part of the transmission rate of a plurality of recording receivers.

In a step 1004, the remote server 109 determines which, apart from it, among the recording receivers 101 to 108 has portions corresponding to the video program to be displayed. To do this, it runs through the metadata corresponding to the video program to be displayed stored in its video program database and seeks K recording receivers having portions of the video program to be displayed. For each recording receiver identified, the remote server 109 determines whether this recording receiver is not already involved in a retransmission of portions. A recording receiver already involved in a retransmission of portions is not reused.

During a step 1005, the remote server 109 checks the number k of recording receivers identified as being able to transmit portions of the program requested. If k<K, the number k of recording receivers identified is less than the number k of recording receivers to be used, the remote server 109 substitutes itself for the K–k missing recording receivers. The remote server 109 therefore participates in the transmission of the portions for displaying the video program requested by the recording receiver 101. In a particular case, if no recording receiver has portions for the video program requested, the remote server 109 is the only one to transmit the portions.

Following step 1006 where, if at least K recording receivers able to transmit the portions corresponding to the video program requested have been identified, the remote server 109 implements a step 1007 during which it creates a list containing, for each portion of the binary stream corresponding to the program requested, information indicating to which period of the video program the portion corresponds, or the index of the portion and information indicating where to find the portion. This list corresponds to the list received by the recording receiver 101 during step 903.

During step 1008, the list is sent to the recording receiver 101 so that it can continue the implementation of the method in FIG. 9.

In one embodiment, if more than K recording receivers able to transmit portions corresponding to the video program to be displayed are identified during step 1004, the remote server 109 designates K of them randomly.

In one embodiment, if more than K recording receivers able to transmit portions corresponding to the video program to be displayed are identified during step 1004, the remote server 109 designates K of them on a criterion of distance between the recording receivers. The recording receivers closest to the recording receiver 101 are chosen. A distance between two recording receivers is calculated by counting the number of routers to be passed through so that the two recording receivers can communicate. Two recording receivers are declared close if the number of routers to be passed for communicating between the two recording receivers is small.

In one embodiment, if more than K recording receivers able to transmit portions corresponding to the video program to be displayed are identified during step 1004, the remote server 109 designates K of them belonging to the same internet access provider. The recording receivers belonging to users subscribing to the same internet access provider are favoured.

The invention claimed is:

1. A method for recording a video program, said video program being received in the form of a binary stream by at least one receiver, each receiver being referred as recording receiver, having to record the video program on a remote server, each recording receiver being connected to the remote server by a communication network and having a transmission rate, the binary stream having been encoded according to an encoding rate, wherein the method is implemented by each recording receiver and, for one of the at least one recording receiver, the method comprises:
   obtaining a value called compression factor used by the recording receiver to determine which sub-part of the binary stream to send to the remote server, the compression factor being (a) computed by dividing a value representative of the transmission rate of the recording receiver by a value representative of the encoding rate of the video program to record, or (b) computed by dividing the value representative of the transmission rate of the recording receiver by a sum of values representative of encoding rates of each video program to record, or (c) determined by choosing a value that is between the encoding rate of the video program divided by a value representative of a mean transmission rate of recording receivers and a lesser of a total number of recording receivers and a maximum number of connections accepted by the remote server,
   dividing the binary stream into a set of successive portions of fixed size and ordering the portions in function of their order of appearance in the binary stream;
   determining a subset of portions to be transmitted to the remote server from the set of successive portions by selecting in the set of successive portions, portions spaced apart by a number of portions equal to the compression factor and by parsing the set of successive portions from a portion corresponding to an offset value, the offset value being a remainder of an integer division of a random number determined by the recording receiver by the compression factor, and
   transmitting the portions in the determined subset of portions to the remote server in order to save thereof, the transmission being prevented by the remote server if another recording receiver has already sent a same offset value to the remote server.

2. The method according to claim 1 wherein the size of the portions is measured according to a size measurement representing a number of binary data.

3. The method according to claim 1 wherein the size of the portions is measured according to a size measurement representing a duration, each portion in the set of successive portions corresponding to a fixed interval of time in the video program.

4. The method according to claim 1 wherein, prior to the transmission of the portions in the subset of portions, the recording receiver transmits to the remote server a set of metadata representing the video program comprising the offset value, the compression factor and a value representing the size of the portions.

5. The method according to claim 4 wherein the recording receiver also records the portions in the set of successive portions or the portions in the subset of portions in a local storage unit of the remote server.

6. The method according to claim 5 wherein the recording receiver periodically sends a request for authorisation of deletion of portions to the remote server and, in the event of reception of a positive response to a request for authorisation of deletion of portions, deletes the recorded portions in the local storage unit.

7. The method according to claim 5 wherein, following the recording of at least part of the binary stream on the remote server, the recording receiver transmits to the remote server a request to display the video program, receives portions corresponding to the binary stream from the remote server and/or from at least one other recording receiver that saved the portions of the binary stream and reconstitutes the binary stream in order to display thereof.

8. A method for recording a video program, said video program being received in the form of a binary stream by receivers, referred to as recording receivers, of a set of recording receivers having to record the video program on a remote server, each recording receiver being connected to the remote server by a communication network and having a transmission rate, the binary stream having been encoded according to an encoding rate, wherein the method comprises, when it is implemented by the remote server:
   obtaining at least one set of metadata, each set of metadata having been transmitted by one of the recording receivers and comprising an offset value, the offset value being a remainder of an integer division of a random number determined by said recording receiver by a value called compression factor obtained by said recording receiver, the compression factor being used by said recording receiver to determine which sub-part of the binary stream to send to the remote server, the compression factor being (a) computed by dividing a value representative of the transmission rate of the recording receiver by a value representative of an encoding rate of the video program to record, or (b) computed by dividing the value representative of the transmission bitrate of said recording receiver by a sum of values representative of encoding rates of each video program to record, or (c) determined by choosing a value that is between the encoding rate of the video program divided by a value representative of a mean transmission rate of recording receivers and a lesser of a total number of recording receivers and a maximum number of connections accepted by the remote server,
   seeking recording receivers associated with the same offset value in the set of recording receivers that transmitted metadata for the video program,
   receiving the binary stream in the form of portions from one recording receiver of the set of recording receivers for each different offset value received, each recording receiver having divided the binary stream in a set of successive portions of fixed size and having ordered the portions in function of their order of appearance in the binary stream, and having determined the portions it is transmitting by selecting in the set of successive portions, portions spaced apart by a number of portions equal to the compression factor and by parsing the set of successive portions from a portion corresponding to a offset value; and, reconstituting the binary stream in order to store thereof in a storage unit of the remote server.

9. The method according to claim 8, wherein after reception of the portions from one recording receiver for each different offset value received, the absence of some portions prevents a reconstitution of the binary stream, the remote server transmits to at least one recording receiver information representing at least one missing portion, so as to cause the sending of each missing portion.

10. The method according to claim 8 wherein, following the reception of a request for authorisation of deletion of portions from the recording receiver, the remote server transmits a deletion authorisation to this recording receiver comprising a list of portions to be deleted.

11. The method according to claim 8 wherein, prior to an opening of a connection for one recording receiver for each different offset value received, the remote server waits for a predefined period.

12. The method according to claim 8, wherein when a portion is received, each portion is associated with a descriptor comprising information representing the position of the portion in the binary stream and information representing the recording receiver that transmitted the portion.

13. The method according to claim 12 wherein, following the reconstitution of the binary stream, the remote server receives a request to display the video program from a first recording receiver, the remote server constructs a list indicating, for at least one portion of the binary stream, at least one second recording receiver comprising a local storage unit in which said portion is saved.

14. A receiving device able to remotely record a binary stream representing a video program, wherein the receiving device is configured for:
obtaining a value called compression factor, used by the receiving device to determine which sub-part of the binary stream to send to a remote server device, the compression factor being (a) computed by dividing a value representative of the transmission rate of the recording receiver by a value representative of an encoding rate of the video program to record, or (b) computed by dividing the value representative of a transmission rate of the receiving device by a sum of values representative of encoding rates of each video program to record, or (c) determined by choosing a value that is between the encoding rate of the video program divided by a value representative of a mean transmission rate of recording receivers and a lesser of a total number of recording receivers and a maximum number of connections accepted by the remote server;
dividing the binary stream into a set of successive portions of fixed size according to the compression factor obtained, the portions being ordered in function of their order of appearance in the binary stream;
determining a subset of portions to be transmitted to the remote server device from the set of successive portions by selecting in the set of successive portions, portions spaced apart by a number of portions equal to the compression factor and by parsing the set of successive portions from a portion corresponding to an offset value, the offset value being a remainder of an integer division of a random number determined by the receiving device by the compression factor; —transmitting portions in the subset of determined portions to the remote server device in order to save thereof, the transmission being prevented by the remote server device if another receiving device has already sent a same offset value to the remote server device.

15. A server device able to record a binary stream representing a video program, wherein the server device is configured for:
obtaining at least one set of metadata, each set of metadata having been transmitted by a receiving device of a set of receiving device and comprising an offset value, the offset value being a remainder of an integer division of a random number determined by the receiving device by a value called compression factor obtained by the receiving device, the compression factor being used by the receiving device to determine which sub-part of the binary stream to send to the server device, the compression factor being (a) computed by dividing a value representative of the transmission rate of the recording receiver by a value representative of an encoding rate of the video program to record, or (b) computed by dividing the value representative of the transmission bitrate of the receiving device by a sum of values representative of encoding rates of each video program to record, or (c) determined by choosing a value that is between the encoding rate of the video program divided by a value representative of a mean transmission rate of recording receivers and a lesser of a total number of recording receivers and a maximum number of connections accepted by the remote server;
seeking receiving devices associated with the same offset value in the set of receiving devices that transmitted metadata for the video program;
receiving the binary stream in the form of portions from one receiving device for each different offset value received, each receiving device having divided the binary stream into a set of successive portions of fixed size according to the compression factor, the portions being ordered in function of their order of appearance in the binary stream and having determined the portions that it transmits to the server device by selecting in the set of successive portions, portions spaced apart by a number of portions equal to the compression factor parsing the set of successive portions from a portion corresponding to a offset value; and
reconstituting the binary stream in order to storage thereof in a storage unit of the server device.

16. A system for recording video programs comprising at least one receiving device according to claim 14.

17. Non-transitory information storage medium storing a computer program product containing instructions for implementing, by a device, the method according to claim 1 when said computer program is executed by a processor of said device.

18. Non-transitory information storage medium storing a computer program product containing instructions for implementing, by a device, the method according to claim 8 when said computer program is executed by a processor of said device.

* * * * *